United States Patent [19]

Lawson

[11] 4,095,324

[45] Jun. 20, 1978

[54] HANDHELD VALVE REPLACEMENT TOOL

[76] Inventor: William Lawson, 1341 SW. 21st Ter., Fort Lauderdale, Fla. 33311

[21] Appl. No.: 690,914

[22] Filed: May 28, 1976

Related U.S. Application Data

[63] Continuation-in-part of Ser. No. 584,365, Jun. 6, 1975, abandoned.

[51] Int. Cl.[2] .............................................. B23P 19/04

[52] U.S. Cl. ....................................................... 29/249

[58] Field of Search .................. 29/249, 282, 280, 275

[56] References Cited

U.S. PATENT DOCUMENTS

| | | | |
|---|---|---|---|
| 2,434,456 | 1/1948 | Cook | 29/249 |
| 2,956,462 | 10/1960 | Paul | 81/64 |
| 3,065,528 | 11/1962 | Marshall | 29/249 |
| 3,564,697 | 2/1971 | Shalaty et al. | 29/272 |
| 3,793,999 | 2/1974 | Seiler et al. | 29/249 |

*Primary Examiner*—James L. Jones, Jr.
*Attorney, Agent, or Firm*—Eugene F. Malin; Barry L. Haley

[57] ABSTRACT

A hand-held tool for removing or replacing valve stem keepers such as utilized with spring tensioned valves found in an internal combustion engine, the device having a rigid body with one end face of the body having a cavity disposed therein. The body cavity includes a larger diameter cavity and a relatively smaller diameter cavity. A resilient sleeve having an annular lip at one end is removeably coupleable within said smaller diameter cavity and is utilized with the rigid body for placement or replacement of valve stem keepers. The tool body includes a passage between the body exterior and the smaller cavity to provide pressure balance and ease of removal of the resilient sleeve. With the resilient sleeve removed, the device is utilized to remove the valve stem keepers in a normal manner. The body of the tool is sized to be engageable with the particular valve spring retainer located adjacent the end of a valve stem. The device facilitates combustion engine valve removal placement or replacement such that the valve keepers may be placed, removed or replaced with a single blow or any force such as a hammer applied to one end of the device.

2 Claims, 5 Drawing Figures

HANDHELD VALVE REPLACEMENT TOOL

This application is a continuation-in-part of application Ser. No. 584,365, filed June 6, 1975, now abandoned.

BACKGROUND OF THE INVENTION

This invention relates generally to a hand-held tool which is used to facilitate either the removal or the replacement of a valve in an internal combustion engine, and more specifically to a hand-held tool utilized in conjunction with a hammer or the like which facilitates the disengagement or engagement of valve stem keepers from a valve stem which is under spring tension as found in a conventional internal combustion engine.

In most conventional internal combustion engines, each intake and exhaust valve is connected to the engine under heavy spring tension. With most conventional valve arrangements, a spring retainer is disposed about the valve stem which acts in conjunction with a plurality of keepers to lock the valve to the valve spring. The removal or replacement of a valve from an engine has oftentimes been time consuming and laborious because the valve stem keepers themselves are quite small and difficult to grasp and do not oftentimes remain in place. Also special tools have been employed to overcome spring tension of the valve spring. This difficulty in removing or replacing the valve stem keepers increases the labor time and cost of an engine repair. The instant invention overcomes the problems of the prior art by providing a non-complex hand-tool which allows for valve removal or replacement with a single hammer blow without the use of a spring puller or the like.

BRIEF DESCRIPTION OF THE INVENTION

A hand-held tool for replacing or removing valve stem keepers from a valve utilized in an internal combustion engine or smaller units utilizing popit valves which includes a rigid elongated body, said body having a cavity disposed at one end, said cavity having a truncated conical section and a smaller diameter cylindrical section at the inner surface of the conical section. A hollow, resilient, cylindrical sleeve having an annular recess at one end is removeably connected within the body cavity and extended in length to protrude beyond the end face of said rigid body. In one embodiment, the sleeve is threadably mounted within the cylindrical section of the body cavity, the sleeve function to provide holding tension to valve stem keepers during the replacement operation of a valve. The tool body includes a passage that communicates from the exterior surface to the cavity housing the resilient sleeve to prevent air pressure build-up and to allow removal of the sleeve. A connector means may be disposed at the body end opposite the cavity to allow the tool body to have an extension or the like attached thereto. The rigid body exterior may be cylindrically-shaped. The resilient sleeve, which in the preferred embodiment is constructed of a rubber or rubber-like material, is tubular and includes a hollow internal passage having a diameter approximately equal to the diameter of the valve stem and keepers. The body of the tool has a diameter size such that the end surface surrounding the cavity of the body will engage a conventional valve spring retainer found in an internal combustion engine. The annular recess at one end of the resilient sleeve receives the valve keepers to aid in positioning the keepers during the operation of the device.

The instant invention is utilized in two different modes dependent upon whether the valve is to be removed or replaced. For the removal of a valve, the tool is utilized without the resilient sleeve which may be easily removed from the tool body and pulled out by hand. Thus, without the resilient sleeve, the rigid tool body is then disposed with the end having a cavity flush against the valve spring retainer. In this position, a blow from a hammer against the opposite end of the tool will cause the valve spring to depress, releasing the tension on the valve stem keepers which acts to allow them to drop away from the valve stem where they will be received into the body cavity of the tool during this operation.

To replace a valve the resilient sleeve is then connected back within the rigid tool body. The sleeve may be of such a length to protrude slightly from the end surface of the tool face. In the replacement operation, the valve spring retainer and the valve stem keepers which lock the retainer under spring tension are aligned with and positioned about the end of the valve stem. The end of the resilient sleeve having the annular recess is then disposed over the end of the valve stem in contact with the valve stem keepers. The end surface of the tool body (cavity end) is positioned in contact with the outer perimeter of the valve spring retainer. With this particular alignment and the resilient sleeve recess wall pushing against the valve stem keepers, the opposite end of the tool is struck with a blow from a hammer which depresses the valve spring allowing the retainer and the keepers to move downward to engage the retaining grooves in the valve stem, locking the keepers in place. It is noted that the resilient sleeve, under the impact blow of the hammer, expands outwardly from its mid-section forcing the annular recess wall inwardly which applies a force inwardly on the keepers tending to hold the keepers against the valve stem, while at the same time imparting a downward motion on the keepers to provide the proper positioning so that they may be locked and tensioned against the spring retainer.

The device may be operated in two modes dependent upon the particular operation, and, with the removal or addition of the rubber sleeve, the device can function for either the valve removal or valve replacement operation. The sleeve itself may have a threaded or surrated exterior surface portion which is threadably engageable with the inner cylindrical cavity portion within the rigid tool body such that it is removeably attached but firmly held in place during the operation of the device. The outer conical cavity is wider in diameter than the diameter of the sleeve which allows for a hollow area within the tool body for the expansion of the sleeve during the replacement operation so that the sleeve itself may buckle outwardly to provide a force to hold the keepers against the valve stem.

It is an object of this invention to provide a non-complex hand-tool for facilitating the removal or replacement of valves found in a conventional internal combustion engine.

It is another object of this invention to provide a valve removal and replacement tool which facilitates the replacement or removal of locking keepers or cotters used in conjunction with a valve, valve spring and spring retainer as found in a conventional internal combustion engine.

And yet another object of this invention is to provide a hand-held valve keeper actuating tool which is non-complex in design and may be manufactured at reduced cost which reduces the time required for the removal or replacement of valve spring keepers.

In accordance with these and other objects which will be apparent hereinafter, the instant invention will now be described with particular reference to the accompanying drawings.

PREFERRED EMBODIMENT OF THE INVENTION

Figure 1:
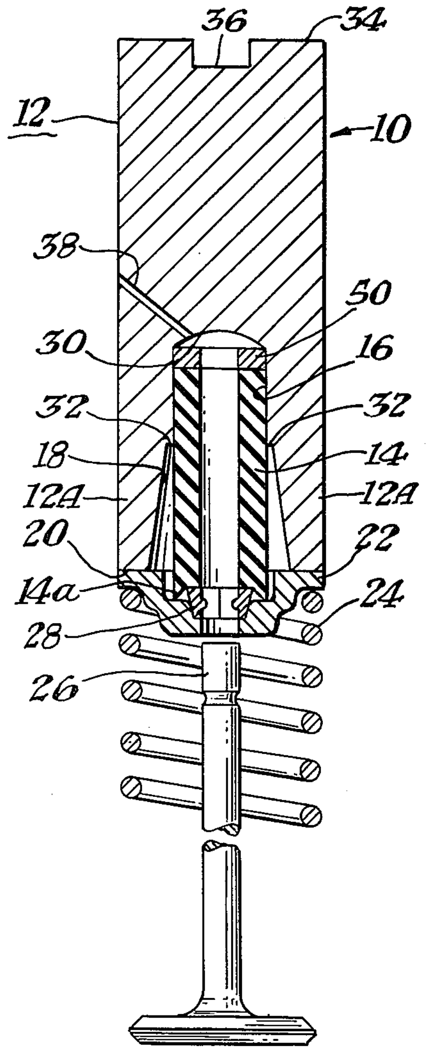
FIG. 1 shows a side elevational view partially in cross-section of the instant invention as used in conjunction with the replacement of valve keepers found in conventional internal combustion engine valves.

Referring now to the drawings and especially FIG. 1, the instant invention is shown as it is used for the replacement of the valve stem keepers and includes a rigid, elongated, cylindrical body 12 having a cavity disposed within end surface 20, the cavity being defined by an outer truncated conical chamber 18 and an inner cylindrical chamber 16 of a smaller diameter terminating in surface 30 and opening into the first portion 18 adjacent surface 32. Chamber 18 may be cylindrical or another shape to receive sleeve 14. A pressure relief passage 38 extends from the exterior surface of body 12 smaller cavity chamber 12. In the preferred embodiment, the exterior surface of body 12 is cylindrical, with the chamber 18 having conically tapered wall portions which increase in thickness away from end surface 20. Connected to and disposed removeably within the second chamber 16 is a resilient sleeve 14 which protrudes into chamber 18. Sleeve 14 may be constructed of a single piece of material or a two piece inner and outer sleeve. The outer surface of the resilient sleeve 14 may be notched or threaded while the inner surface of the second chamber 16 may be threaded groove portions so that the resilient sleeve is firmly but removeably attached within the second chamber. The inner diameter of the resilient sleeve 14 is sized to receive a valve stem as found in the conventional internal combustion engine. The resilient sleeve 14 includes an annular recess at one end providing a lip **14*a***.

As shown in FIG. 1, the device 10 is positioned with an end surface 20 in contact and engaged with a conventional valve spring retainer 22 which is disposed over valve stem 26 with the valve spring 24 properly positioned relative to the spring retainer 22 such that the longitudinal axis of the body 12 and resilient sleeve 14 are in line with the axis of the valve stem 26. Valve keepers 28 are prepositioned adjacent the aperture in valve spring retainer 22 and are engaged in the annular recess **14*a* of resilient sleeve 14 such that the free end of the sleeve 14 holds the keepers 28 against the upper surface of spring retainer 22. In this posture the device is ready to be struck with a hammer or the like such that a force is applied to the end surface 34 of the body. Also disposed within end 34 is a connector recess 36 which may be used to attach an extension rod or the like to the device. A sharp blow applied against end surface 34 of body 12 thus forces spring 24 downward thrusting the free end of the valve stem 26 through the aperture in the valve spring retainer 22 and between the keepers 28 receiving the valve stem into the resilient sleeve 14. Passage 38** permits air trapped in the cavity to be vented to prevent pressure build-up during operation.

Figure 2:
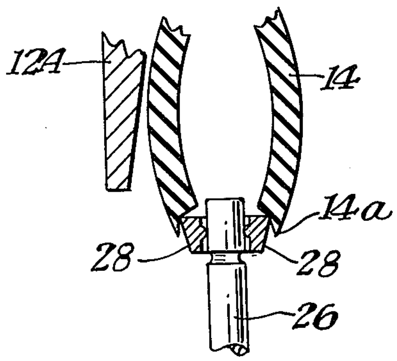
FIG. 2 shows a fragmentary side elevational view in cross-section of the co-operation between the resilient sleeve of the instant invention and the replacement of valve keepers in accordance with the instant invention.

FIG. 2 shows the effect of the instantaneous blow on the resilient sleeve 14 which tends to make it buckle or be deformed outwardly which applies a lateral force on the keepers 28 within lip **14*a* while stem 26 is moving into the sleeve 14. When the stem is moved to the correct position relative to the keepers, the keepers will lock the spring retainer to the stem, with the keepers being locked to the stem under spring tension. Thus the force which deforms the resilient sleeve applied along the longitudinal axis of the device causes the resilient sleeve to have an inward radial force which acts to retain the keepers adjacent the stem surface until the keepers are properly positioned, engaged, and locked in the valve stem grooves. Spring tension from the valve stem 26 acting against the spring retainer 22 which is in communication with the valve keepers 28** will thus firmly hold the keepers in place.

Figure 3:
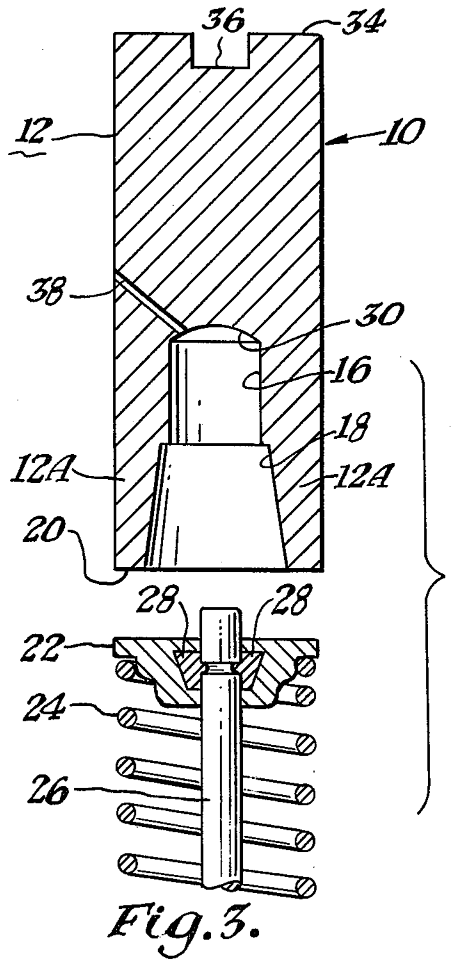
FIG. 3 shows the instant invention with the resilient sleeve removed for use in the removal of the valve stem keepers as found in the conventional valves in an internal combustion engine.

Referring now to FIG. 3, the device is shown with the resilient sleeve removed from the second chamber 16. to allow the device to be itilized from the removal of the valve stem keepers 28 as follows. FIG. 3 shows the valve spring tensioning the spring retainer 22 against keepers 28 which are locked into the grooves in the valve stem 26, which is the normal position for holding a valve in tension in a conventional internal combustion engine. To remove the valve, the valve stem 26 must be disengaged from the keepers 28. To accomplish removal of the keepers, the tool body end surface 20 of tool body 12 is brought into contact with the valve spring retainer 22 such that the longitudinal axis of the body is in line with the longitudinal axis of the valve stem 26. A force such as a sharp blow of a hammer is then applied to the body end 34 which causes the spring 24 to be depressed, releasing the tension against the keepers 28 caused by spring retainer 22. This instantaneous movement of the spring retainer 22 thus allows the keepers 28 to separate laterally away from the valve stem groove, releasing them and the valve spring retainer from the valve stem. The outer chamber 18 and inner chamber 16 provides sufficient space for the end of the valve stem 26 to move within the tool body 12 and for the keepers to disengage from the stem.

The device is advantageous because it may be constructed at low cost, is non-complex in operation and does not require excessive training or skill on the part of the operator to allow for the removal or replacement of valves in a conventional internal combustion engine. In the preferred embodiment, the body of the device may be constructed of a hard steel or the like while the retainer sleeve is made from a rubber, either artificial or natural material, or any suitable resilient material having the resilient characteristics of rubber.

Figure 4:
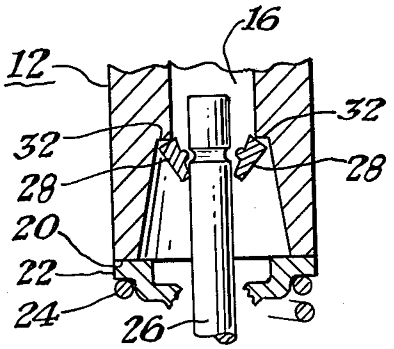
FIG. 4 shows a side, elevational cross-section view of a fragmentary portion of the instant invention.

FIG. 4 shows surface 32 which interacts with the valve stem keepers 28 to aid in the removal of the keepers 28 from adjacent the stem 26 during the valve removal operation. The inner body chamber 16 is sized to receive the valve stem 26, with the tool surface 20 engaging the valve spring retainer 22. Surface 20, when the tool is struck with a blow from a hammer or the like, thus depresses the valve spring retainer 22 against the valve spring (not shown) causing the valve stem itself to be received into the upper chamber 16 of the tool body. Should the valve spring keepers 28 not disengage from the valve stem 26 instantaneously upon the release of spring tension, the inner cavity surface 32 is sized to engage the keepers upon the movement of the stem into chamber 16 causing them to be forced away from the valve stem so that they are easily disengaged and removed.

Figure 5:
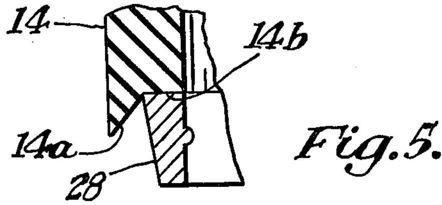
FIG. 5 shows a fragmentary side elevational cross-section view of the annular recess wall of the resilient sleeve engaging a keeper.

FIG. 5 shows the resilient sleeve end that engages the keepers for replacement on the stem. The upper edge of keeper 28 engages recess wall 14*b*, while annular lip 14*a* acts to hold the keeper radially. The lip 14*a* moves toward the keeper when the body is struck to prevent outward radial movement of the keeper.

Passage 38 (FIG. 1) may also be used with an elongated tool to aid in the removal of the resilient sleeve positioned in the passage to force the sleeve out of the smaller cavity 16 if necessary.

FIG. 1 shows sleeve 14 with adjustment sleeve extension 50 to extend the distal end of sleeve 14 below end surface 20 when the retainer is shaped similar to that shown in FIG. 1 at 22. An adjustment may be made by changing or removing sleeve extension 50. For example, when the retainer is flat, the sleeve extension 50 may be removed to place the distal end of sleeve 14 at the mouth of cavity 18, thereby adjusting the keepers 28.

The instant invention has been shown and described herein in what is considered to be the most practical and preferred embodiment. It is recognized, however that departures may be made therefrom within the scope of the invention and that obvious modifications will occur to a person skilled in the art.

What I claim is:

1. An impact tool for the removal and replacement of valve stem keepers for a valve spring retainer on a valve stem as utilized in a conventional internal combustion engine comprising:

a relatively rigid, elongated body, said body having a striker surface and having in one end a first chamber and a second chamber, said first chamber having a conically tapered internal wall and said second chamber having a smaller relative diameter than said first chamber disposed within the end of said first chamber; and a resilient, valve stem keeper restraining sleeve removeably connectable within said second chamber, said resilient sleeve protruding into said first chamber, said sleeve having an annular recess disposed at the distal end sized to receive said valve stem keepers.

2. An impact tool for the removal and replacement of valve stem keepers for a valve comprising:

a relatively rigid, elongated, cylindrical body, said body having disposed adjacent one end surface a first chamber and a second chamber, said first chamber having a conically tapered internal wall and said second chamber having a smaller relative diameter than said first chamber, said end surface having at least three points of contact, said body having an internal passage between said second chamber and said body exterior; and a resilient valve stem keeper restraining sleeve, said sleeve removeably connectable within said second chamber, said resilient sleeve protruding into said first chamber, said sleeve having an annular recess disposed at one end, said sleeve in slidable contact with said valve stem keepers on said valve within said annular recess.

* * * * *